(12) United States Patent
Chien

(10) Patent No.: US 8,504,809 B2
(45) Date of Patent: Aug. 6, 2013

(54) AUTOMATED COMMUNICATION CONFIGURATION

(75) Inventor: Herman Chien, Bellevue, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 503 days.

(21) Appl. No.: 12/789,169

(22) Filed: May 27, 2010

(65) Prior Publication Data

US 2011/0296154 A1   Dec. 1, 2011

(51) Int. Cl.
*G06F 15/16* (2006.01)

(52) U.S. Cl.
USPC ............... 713/1; 713/2; 713/100; 709/227; 709/228; 711/133

(58) Field of Classification Search
USPC .......... 713/1, 2, 100; 709/227, 228; 711/133
See application file for complete search history.

(56) References Cited

U.S. PATENT DOCUMENTS

| | | | |
|---|---|---|---|
| 6,219,786 B1 | 4/2001 | Cunningham et al. | |
| 6,389,422 B1 | 5/2002 | Doi et al. | |
| 7,826,845 B2 * | 11/2010 | Chen | 455/435.3 |
| 7,899,446 B2 * | 3/2011 | Chen | 455/418 |
| 7,917,182 B2 * | 3/2011 | Zhang et al. | 455/567 |
| 2004/0006615 A1 | 1/2004 | Jackson | |
| 2005/0003822 A1 * | 1/2005 | Aholainen et al. | 455/445 |
| 2005/0138604 A1 | 6/2005 | Harrison | |
| 2006/0143703 A1 | 6/2006 | Hopen et al. | |
| 2007/0150921 A1 * | 6/2007 | Mueller et al. | 725/62 |
| 2008/0051035 A1 * | 2/2008 | Zhang et al. | 455/67.11 |
| 2008/0318628 A1 * | 12/2008 | Chen | 455/556.2 |
| 2010/0262820 A1 * | 10/2010 | Chen | 713/2 |

OTHER PUBLICATIONS

"Automatic Proxy Configuration Scripts," a software support guide, eSoft, InstaGate, and ThreatWall, © 2008 http://www.esoft.com/support_docs/AutomaticProxyConfigurationScripts.pdf.
"Proxy autoconfiguration (proxy.pac) reference card / cheat-sheet," Jan-Piet Mens, Oct. 2, 2009 http://blog.fupps.com/2009/10/02/proxy-autoconfiguration-pac-reference-card-cheat-sheet/.
"Proxy auto-config," From Wikipedia, The Free Encyclopedia http://en.wikipedia.org/wiki/Proxy_auto-config.

* cited by examiner

*Primary Examiner* — M Elamin
(74) *Attorney, Agent, or Firm* — Akerman Senterfitt; Michael K. Dixon; Roy Zachariah

(57) ABSTRACT

A method for use at a user device of a communications network include utilizing a configuration file obtained from a remote device to configure a communication of an application executed at the user device without requiring user input, the configuration file including logic applied by the application to identify, from a plurality of data bearers available to the user device, a select data bearer for use in conducting the communication based on one or more parameters representative of the current operational context of the user device. The user device includes a storage module to store a configuration file obtained from a remote device and a processing module to execute an application, wherein during execution the application is to utilize logic of configuration file to identify, from a plurality of data bearers available to the user device, a select data bearer for use in conducting a communication of the application.

20 Claims, 4 Drawing Sheets

AUTOMATED COMMUNICATION CONFIGURATION

FIELD OF THE DISCLOSURE

The present disclosure relates generally to networks, and relates more particularly to configuration of communications in a network.

BACKGROUND

Many user devices, such as so-called "smart" mobile phones, support numerous applications that require data communications with remote sources or destinations. Increasingly, these user devices are capable of connecting to multiple data bearers for conducting these communications.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

Figure 1:
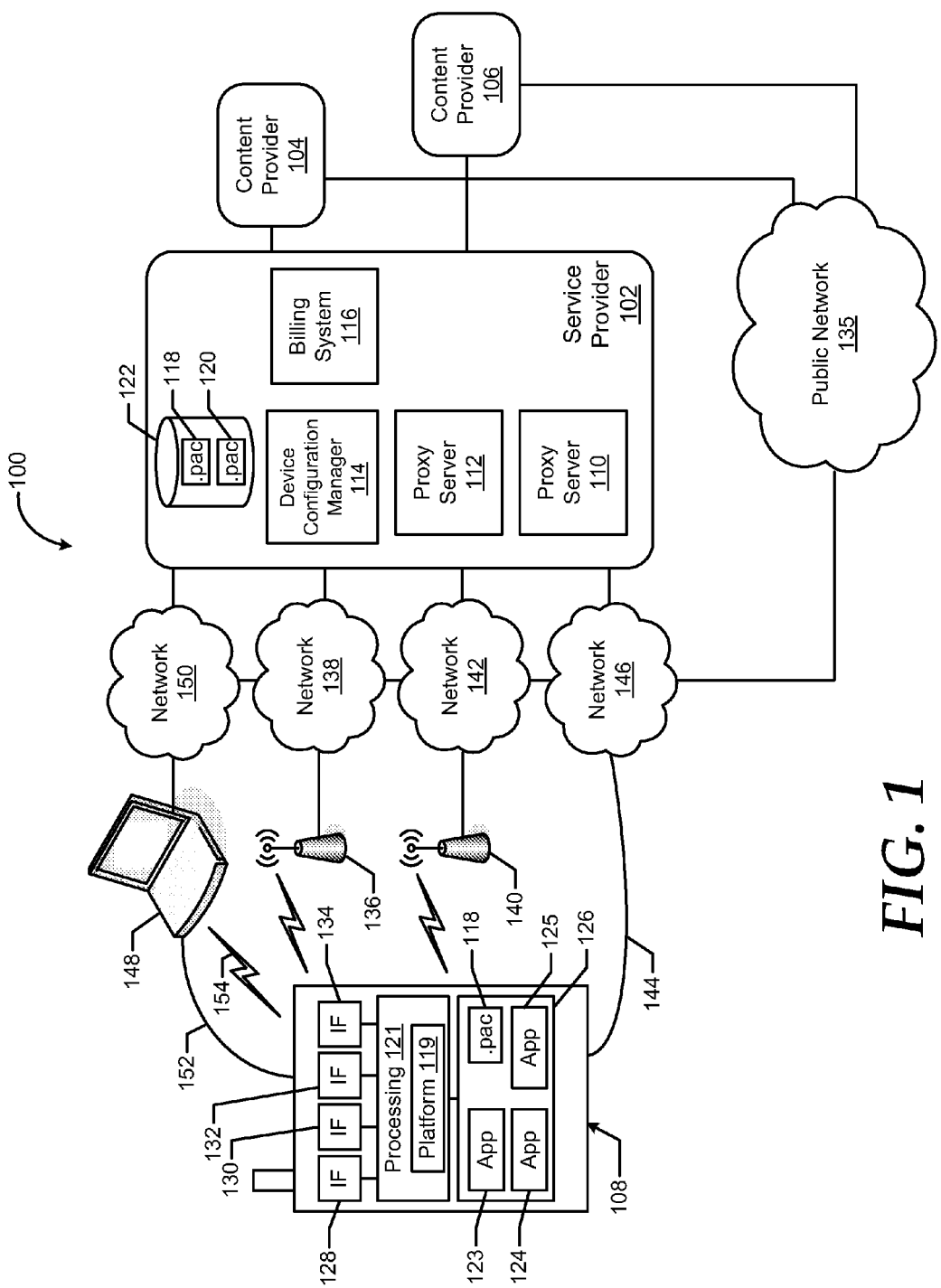
FIG. 1 is a diagram illustrating a communications network utilizing automated communication configuration in accordance with at least one embodiment of the present disclosure.

The numerous innovative teachings of the present application will be described with particular reference to the presently preferred example embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

For ease of discussion, the techniques of the present disclosure in some instances are illustrated in the example context of a third generation (3G) or fourth generation (4G) mobile telecommunications network utilized to convey voice data, multimedia data, and other content between mobile devices, service providers, and other components of the network. However, these techniques are not limited to this example context, but instead can be implemented in any of a variety networks configured to support the transmission of data using the guidelines provided herein.

FIGS. 1-4 illustrate techniques for configuring communications of applications executed at a user device without requiring user input. A user's satisfaction with a user device typically is dependent on the seamless execution of one or more applications at the user device. Often, these applications utilize communications with remote devices so as to provide or obtain information, such as when a web browser application obtains web page information for presentation to the user or submits data through a web page form that has been presented to the user. However, different applications may have different settings necessary for more-optimal performance, as may different communications within a particular application. To illustrate, a web browser application may be required to make use of a hypertext transfer protocol (HTTP) proxy for parental control, validation, or value-added purposes, whereas a video-streaming application may not make use of proxying, but may require the use of a data bearer with a relatively high data bandwidth. Users typically are unaware of these dependencies and thus often are unable to identify an incorrect communication configuration as the cause of a connection failure for an application. Moreover, users typically are inconvenienced or deterred from using a service even when they are made aware of the technical reasons for a failure.

It is impractical to expect the user to understand or deduce the proper connection settings for the myriad of applications and services available through the user device. Accordingly, in at least one embodiment, an updatable configuration file is installed at the user device so as to facilitate automatic (that is, without user input) configuration of communications. The configuration file includes data representing logic used to determine one or more parameters regarding the current operational context of the user device. The configuration file further includes data representing logic that uses the one or more parameters to configure a corresponding communication, such as by selecting an appropriate data bearer from a plurality of data bearers available at the user device, by determining whether the communication is to be proxied, and if so, the address of the proxy server to be used, and the like. In one embodiment, the user device accesses the configuration file from a service provider or other source and then makes the configuration file available for application to the communications of one or more applications executed at the user device. When an application is attempting to establish a communication, platform software, such as an operating system, at the user device accesses the configuration file and applies the logic represented therein to identify the appropriate configuration settings for the communication. The service provider can update the configuration file to reflect changed network conditions or to account for new applications or new session types. The same configuration file may be used for different applications at the user device. Further, the same configuration file may be provided to multiple user devices for consistency between the operations of the user devices. By automating the configuration of a communication through the application of the logic of the configuration file, the user device can more optimally facilitate communications for multiple, varied applications in a manner that is transparent to the user.

FIG. 1 illustrates a communications network 100 implementing automated configuration of communications initiated by user device applications in accordance with at least one embodiment of the present disclosure. The communications network 100 includes a service provider 102, one or more content providers (such as content providers 104 and 106), and at least one user device 108.

The service provider 102 includes components configured to manage the provision of content and services, including content and services available from content providers 104 and 106. As such, the service provider 102 can include, for example, a telecommunications service provider. In the depicted example, the service provider 102 includes one or more proxy servers (such as proxy servers 110 and 112), a device configuration manager 114, and a billing system 116. Other components typically implemented by a service provider, such as routers, gateways, application servers, and the like, are omitted for clarity purposes. The proxy servers 110 and 112 provide various services for communications conducted with the user devices of the network 100, including proxying of communications (e.g., hypertext transfer protocol (HTTP) proxying), authentication, parental control, and value-added services. The billing system 116 maintains records of service plans and features associated with the users of the user devices 108. To illustrate, the service provider 102 may provide the option for a user to pay a fee to obtain prioritized use of a particular data bearer or to obtain the otherwise-prohibited use of a particular data bearer for a particular class of communications, and the user's acceptance of this option may be reflected in the user's record at the billing system 116. The device configuration manager 114 manages the generation and provision of configuration files, such as configuration files 118 and 120, that are used to configure communications conducted by applications executed at the user devices 108 of the network 100. The configuration files may be stored in a database or other data store 122 managed by the device configuration manager 114.

The user device 108 includes any of a variety of user-manipulated devices serviced, at least in part, by the service provider 102. Examples of such user devices include smart cellular telephones, notebook computers, desktop computers, tablet and slate computers, networked personal digital assistants (PDAs), networks multimedia devices such as networked portable music players), video game consoles, and the like. For ease of illustration, an example context whereby the user device 102 comprises a "smart" phone is used below to illustrate various aspects of the present disclosure.

In the depicted example, the user device 108 includes a processing module 121, a memory 126, and one or more communications interfaces, such as communications interfaces 128, 130, 132, and 134. The communications interfaces 128, 130, 132, and 134 comprise interfaces configured to conduct communications with the service provider 102, a public network 135 (such as the Internet), or both via various types of data bearers, such as via short-range, medium range, or long-range wireless data bearers, wired data bearers, tethering through another network-connected device, and the like. As one example, a data bearer available to the user device 108 includes a data bearer implemented via a IEEE 802.11 connection to an access point 136, which in turn is connected to the service provider 102 and the public network 135 via, for example, a local area network 138. As another example, the user device 108 can be connected to the service provider 102 or the public network 135 via a data bearer implemented via a wireless mobile telephony link (implementing, for example, a GSM 3G standard) to a cellular base station 140, which in turn is connected to one or both of the service provider 102 and the public network 135 via, for example, a telecommunications network 142. As yet another example, the user device 108 can be connected to the service provider 102 or the public network 135 via a data bearer implemented via a wired connection 144 such as an Ethernet connection) to a network 146, which in turn is connected to one or both of the service provider 102 and the public network 135. As an additional example, the user device 108 may have available data bearers via tethering to another user device. To illustrate, the network 100 further may include a user device 148 connected to one or both of the service provider 102 and the public network 135 via a network 150. The user device 108 thus takes advantage of data bearers available to the user device 148 by tethering the user device 108 to the user device 148 via, for example, a wired connection 152, such as a Universal Serial Bus (USB) connection, or via a short-range wireless connection 154, such as via a Bluetooth™ connection. Although FIG. 1 illustrates an example whereby each data bearer utilizes a separate network to connect to the service provider 102 and the public network 135, in other instances two or more data bearers may connect to one or both of the service provider 102 and the public network 135 via the same network. For example, the networks 138 and 150 may comprise the same network implemented as a digital subscriber line (DSL) or cable modem connection to the service provider 102. Further, in certain instances, the network connecting the user device 108 to the service provider 102 can include the public network 135 or a network that is part of the service provider 102.

The memory 126 stores executable instructions associated with platform software 119 (an operating system, for example) and one or more applications, such as applications 123, 124, and 125. The processing module 121 is configured to execute the platform software 119 and the applications by accessing and executing the corresponding executable instructions from the memory 126, whereby the execution of the executable instructions manipulates the processing module 121 to perform the one or more operations associated with the platform software 119 or the application. The applications at the user device 108 can include, for example, web browser applications, texting applications, multimedia applications, telephony applications, gaming applications, and the like. Each application is associated with one or more corresponding application types, whereby the application type may be represented by a unique application type identifier provided by the user device 108, by the service provider 102, or the developer of the application. The application type can represent a source of the application, such as by identifying the service provider that supports the application or the developer that developed the application. Alternatively, the application type can represent the nature of the communications conducted with the application. For example, the application type of an application can reflect the data rate of communications conducted with the application, the type or content of data communicated by the application, the priority or quality of service (QoS) level of the communications of the application, and the like.

One or more of the applications executed at the user device 108 may initiate or otherwise make use of a corresponding communication to transfer data to or from the user device 108. To illustrate, a web browser application may establish an HTTP session to access data representing an indicated web site for presentation to a user of the user device 108. As another example, a multimedia application may initiate a real-time streaming protocol (RTP) session or similar communication to obtain a multimedia stream from one of the content providers. Each communication may be subject to various settings or conditions based on the particular circumstances of the communication or particular circumstances of the operation of the user device 108. In the web browser example described above, it may be advantageous to proxy the HTTP session through one of the proxy servers 110 or 112 so that authentication and parental control features can be applied to the HTTP session. In the multimedia application example described above, the service provider 102 may require that the FTP session be conducted via only a limited set of data bearers so as to avoid overwhelming other lower-capacity data bearers.

While some or all of the communications conducted by the user device 108 may be subject to certain conditions or configurations, such settings are not universal among the applications available for execution at the user device, nor are the settings equally applicable to different communications within the same application. Moreover, it may be advantageous for the service provider 102 to change or update the configuration settings so as to reflect the current state of the network 100 or to reflect higher or lower classes of purchased services that allow or disallow identified applications from using certain data bearers. As such, it is difficult for a user to maintain awareness of the appropriate configuration for each communication the user is likely to encounter while operating the user device 108. Accordingly, in at least one embodiment, the service provider 102 generates and maintains the configuration files that are utilized by the user devices of the network 100 so as to automatically configure application-initiated communications without requiring manual user input and in a manner that facilitates seamless updates to the configuration settings.

Each configuration file includes data representative of logic to be applied by the platform software 119 for a communication initiated by an application so as to configure settings of the communication. These settings can include, for example, the particular data bearers permitted for use and a preferred selection order, the particular access point name (APN) to be used, the proxy settings for the communication, and the like. The logic further can represent operations to be performed by the user device 108 to determine particular parameters regarding the current operational context of the user device, whereby these parameters are utilized in establishing the settings for the communication. The parameters of the operational context of the user device can include, but is not limited to, a geographical location of the user device (as indicated by, for example, geographical positioning system (GPS) coordinates), a direction that the user device is facing, a remaining battery power of the user device, applications or application types currently executed by the user device, data input or output rates of the user device, features enabled/disabled at the user device, data bearers available to the user device, current characteristics of the available data bearers, and the like.

In one embodiment, the configuration file is implemented as a proxy access control (PAC) file that utilizes a scripting language (JavaScript, for example) to represent the logic to be applied. The scripts of the configuration file may represent conditional operations (such as if-then-else logic), partial string matches, and other logic to test, include, or exclude various conditions in establishing the settings for a communication. The scripts may use application programming interface (API) calls used by the platform software 119 to obtain the parameters of the current operational context of the user device 108.

In operation, the device configuration manager 114 makes the configuration files 118 and 120 available for use by the user devices 108. In one embodiment, the configuration files 118 and 120 are transmitted to the user devices in association with a firmware update, such as during a firmware over-the-air (FOTA) push process. In another embodiment, the platform software 119 is configured with a pointer or other link to a particular filename and location at the service provider 102, and the device configuration manager 114 stores the most recent version of the corresponding configuration file with the filename at the specified location. Accordingly, the platform software 119 can obtain the most-recent version of the configuration file by accessing the specified file at the specified location in response to a reboot of the user device 108, a start-up of the application, a detectable network event that signifies a substantial network change, a network-initiated push message to check for a new file, or other condition that allows maintenance of a timely configuration file.

In the depicted example, the configuration file 118 is stored in the memory 126 of the user device 108 for access by the platform software 119 executed at the user device. In an alternative embodiment, the configuration file 118 may be stored at, for example, a register file, a flash memory, a disc drive, or other storage component of the user device 108. In either instance, the platform software 119 that utilizes the configuration file 118 can be configured to point to a particular local file name or local location to access the configuration file 118. Any updated configuration files thus may be stored under the local file name or at the local location so that the platform software 119 uses the most-recent version of the configuration file.

Figure 2:
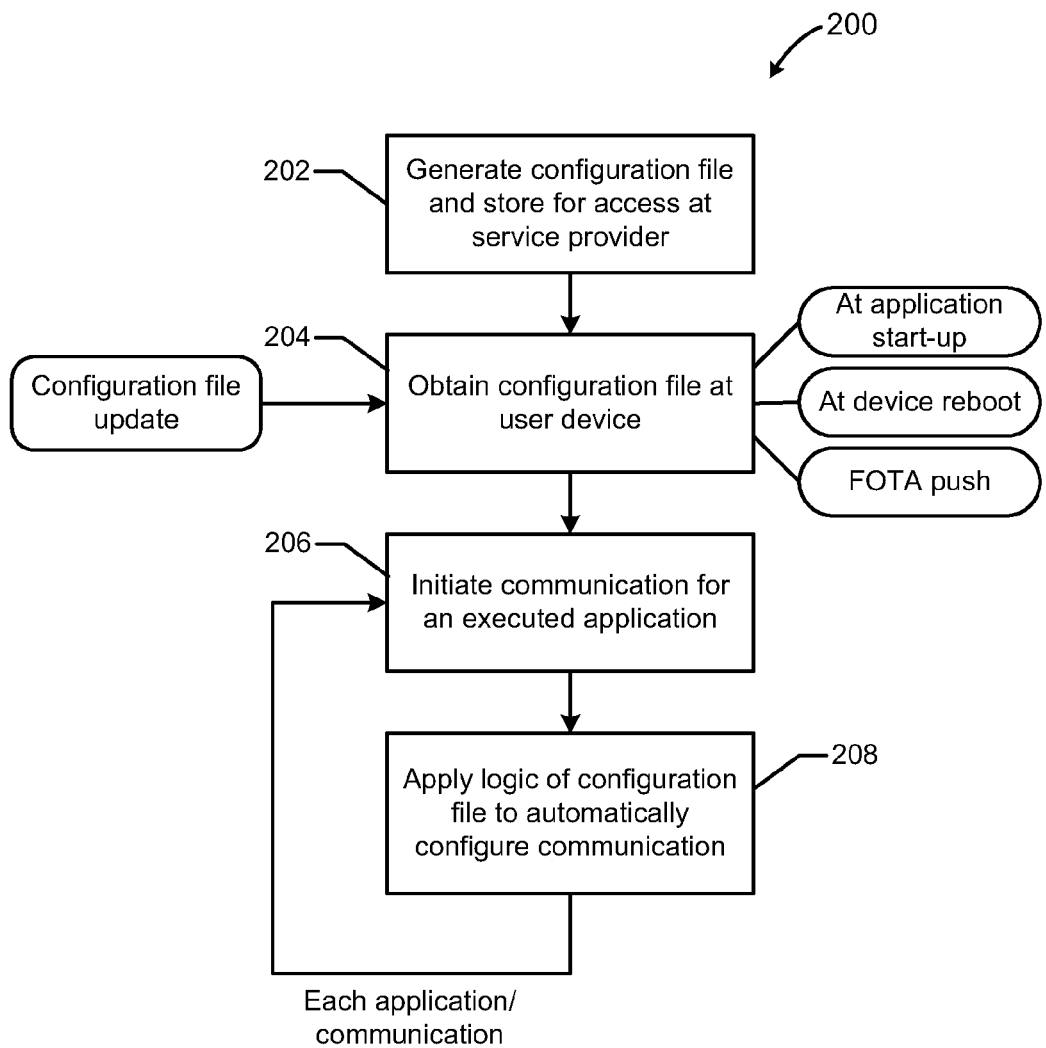
FIG. 2 is a flow diagram illustrating a method for utilizing a configuration file to automatically configure a communication of an application executed at a user device in accordance with at least one embodiment of the present disclosure.

FIG. 2 illustrates a method 200 of operation of the user device 108 for automatic configuration of communications in accordance with at least one embodiment of the present disclosure. The method 200 generally starts at block 202, whereby the service provider 102 generates a configuration file for use in the configuration of communications of one or more applications of one or more user devices supported by the service provider. The generation of the configuration file can include the programming of the scripts in the configuration file by a technician so as to meet current performance goals and operating guidelines of the service provider 102, such as guidelines setting which application types are permitted to access particular data bearers, which communications are to be proxied, which users are permitted access to which data bearers, and in what order, and the like. The device configuration manager 114 then stores the configuration file at the data store 122 and makes the stored configuration file available for provision to the intended user devices.

At block 204, the configuration file is obtained by the user device 108 for implementation by one or more applications of the user device. In one embodiment, the configuration file is obtained through a firmware update, such as a firmware-over-the-air (FOTA) push. The firmware update can be initiated in response to an update to the configuration file. In another embodiment, the basic input-output system (BIOS) or operating system of the user device 108 includes a pointer to a filename and remote location associated with the configuration file such that the user device 108 requests the configuration file from the service provider 102 at a boot-up or reboot of the user device. In yet another embodiment, execution of an application causes the user device 108 to request the configuration file from the service provider 102. Once obtained, the configuration file can be maintained in a secure location at the user device, such as in memory accessible only to the operating system, so as to prevent unauthorized access or tampering.

At block 206, an application executed at the user device 108 initiates a communication to communicate data between the user device and one or more remote devices. To illustrate, a web browser application may initiate an HTTP session to communicate web page information or a simple messaging service (SMS) application may initiate a user datagram protocol (UDP) session to communicate text messages. In response to initiating a communication, at block 208 the platform software 119 accesses the configuration file and utilizes the logic represented by the configuration file to configure the initiated communication without requiring user input to set the configuration settings. As described above, the configuration file can include one or more scripts executed by the platform software 119 to determine one or more parameters of the current operational context of the user device 108 and, from these parameters, configure one or more settings of the communication, such as selecting an available data bearer over which the communication is conducted, configuring proxy settings, and the like.

As noted above, the same configuration file may be used for different communications within a given application and the same configuration file may be used for communications from multiple applications. Accordingly, the processes of blocks 206 and 208 may be repeated for each application or each initiated communication.

Figure 3:
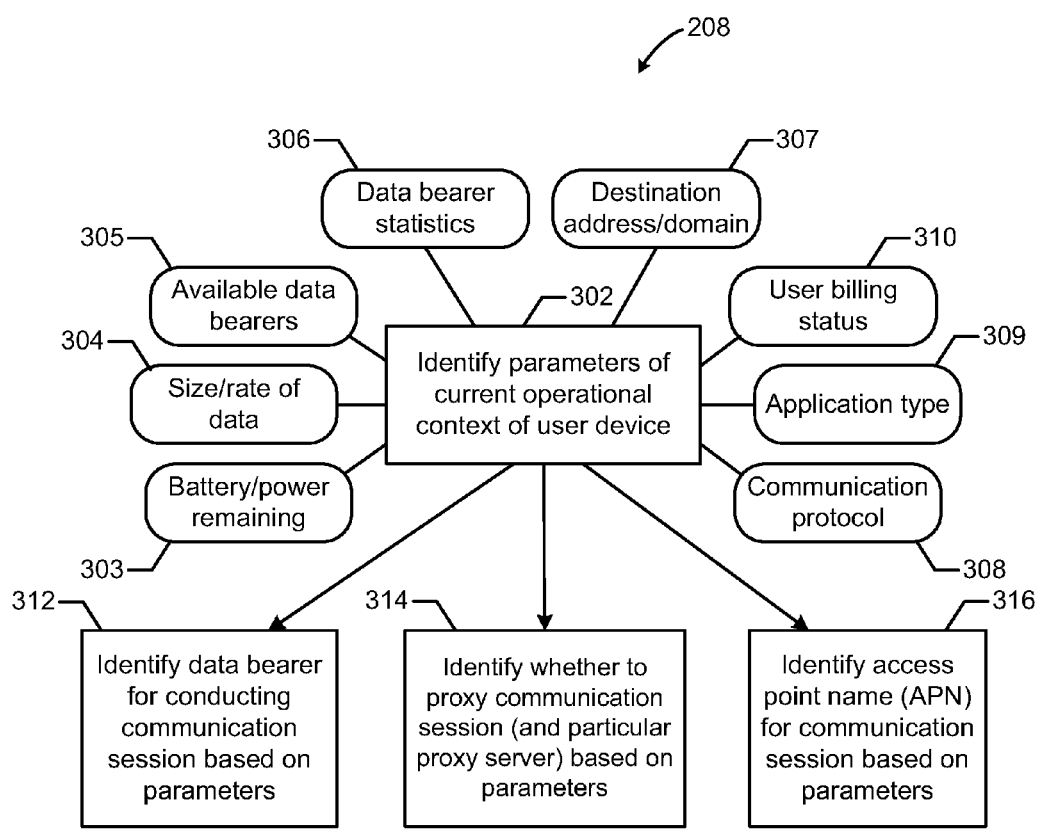
FIG. 3 is a flow diagram illustrating an aspect of the flow diagram of FIG. 2 in greater detail in accordance with at least one embodiment of the present disclosure.

FIG. 3 illustrates the process of block 208 of method 200 in greater detail. In one embodiment, the configuration file includes both logic to determine parameters regarding the current operational context of the user device 108 that are relevant to the configuration of the communication at issue, as well as logic to configure the settings of the communication based on the determined parameters. Accordingly, at block 302, the platform software 119 executes the scripts or other logic of the configuration file pertaining to the determination of the operating parameters. The scripts or other logic may utilize application programming interfaces (APIs) so as to obtain the information representing the parameters.

These parameters can include parameters 303 related to whether the user device 108 is operating on battery power, and if so, the amount of battery power remaining. The parameters also can include parameters 304 related to the size of the data to be transmitted during the communication (for example, the file size of a file to be transferred during an FTP session) or a minimum, average or peak rate of data to be communicated during the communication. The parameters further can include parameters 305 that identify the data bearers available to the user device 108 or parameters 306 related to the network statistics of the available data bearers, such as the average and peak bandwidths, packet loss rates, response times, and the like. The parameters also may include parameters 307 related to the destination of the communication, such as the IP address of the destination or the domain associated with the destination or parameters 308 related to the communication protocol to be used for the communication such as HTTP, FTP, secure sockets layer (SSL), and the like). The parameters also may include parameters 309 relating to the application type of the application initiating the communication. The application type can be identified based on the types of processes performed by the application, such as a multimedia processing type, a game application type, a communication application type, and the like. Alternatively, the application type can be identified on the types of communications conducted by the application. Moreover, as noted above, the application type can be identified based on a type identifier set by the service provider 102 or the developer of the application. Other parameters, such as those relating to geographical location, direction, and the like, also may be used.

The services provided by the service provider 102 to a user often are tied to the particular service plan elected by the user. Accordingly, the parameters additionally can include parameters 310 related to the current billing status or service plan associated with the user device 108. To illustrate, the service provider 102 may have a default service arrangement whereby users are required to use a "Wi-Fi" data bearer for downloading multimedia files and are prohibited from using the service provider's mobile telephony data bearer for such communications. However, the service provider 102 may provide an upgrade or alternative service plan whereby a user can bypass this default setting and instead be permitted to utilize the mobile telephony data bearer for the downloading of multimedia files. In this case, the user's election of this alternative service plan can be reflected in the logic of a configuration file generated for the particular user.

After using the logic of the configuration file to obtain the relevant parameters, the platform software 119 then uses other logic of the configuration file to configure the settings of the communication based on the determined operating parameters. To illustrate, the configuration file may include logic utilized to select or identify, at block 312, a particular data bearer from one or more available data bearers for conducting the communication based on one or more of the parameters. The configuration file also may include logic utilized to determine, at block 314, whether the communication is to be proxied, and if so, the address or other identifier of the proxy server that is to be used for proxying the communication. In the event that the user device 108 is a mobile telephony device, the configuration file further can include logic utilized to determine, at block 316, a particular access point name (APN) to be used for the communication.

Using the process of FIGS. 2 and 3 described above, a service provider can configure and re-configure the user devices supported by the service provider for more-optimal use of the data bearers connecting the user devices to remote devices. One example of this improved decision making includes providing a value-added service for a login phase. To illustrate, the service provider 102 may be partnered with an audio service that needs value-added proxy support for the login phase but does not require proxying for the actual content feeds. In this example, the configuration file may include information representing the following logic:

IF destinationURL=login.myaudio.com AND protocol=HTTP THEN proxy=11.22.33.44
IF destinationURL=audiofeeds.myaudio.com THEN proxy=NA As another example of the improved decision making, the service provider 102 may seek to limit access to particular types of data bearers when other types are available. To illustrate, a service provider may prefer the use of a "Wi-Fi" data bearer over a mobile telephony data bearer for application types related to the streaming of video data from a particular source. Accordingly, the configuration file may include information representing the following logic:

IF destinationURL=myvideo.com AND IF Wi-Fi=available THEN SET bearer=Wi-Fi ELSE IF mobile-telephony=available THEN SET bearer=mobile-telephony Alternatively, the service provider 102 may seek to limit the streaming to only Wi-Fi (and thus prevent video streaming if unavailable), in which case the configuration file may include information representing the following logic:

IF destinationURL=myvideo.com AND Wi-Fi=available THEN SET bearer=Wi-Fi ELSE return errorCode ("cannot establish connection")

As noted above, the service plan elected by the user or operator of the user device 108 may influence the configuration of a communication of an application. To illustrate, the user may elect to upgrade the service plan so as to gain access to a certain data bearer for certain types of communications that otherwise are not permitted on the data bearer. In this manner, the user may have the option to pay a monthly fee to gain access to a mobile telephony data bearer for video streaming. Accordingly, a change in a user's service plan can result in a corresponding update to the configuration file associated with the user. To illustrate, when a user upgrades the service plan to include access to a particular data bearer for a particular application type, the device configuration manager 114 can update the user's configuration file so as to reflect this new option. Conversely, when a user downgrades the service plan to remove access to a particular data bearer, the device configuration manager 114 can update the user's configuration file to reflect this change. These changes can be reflected in the configuration file as, for example, a change in the selection priority among permitted data bearers, addition of logic that permits selection of a data bearer, removal of logic that permits selection of a data bearer, and the like.

Although various examples of the logic implemented by the configuration file have been described for illustrative purposes, the present disclosure is not limited to these examples. Rather, the configuration file can include logic that uses any of a variety of operating parameters, and combinations thereof, to configure any of a variety of settings of a communication. As such, a service provider can take advantage of the ease at which the configuration file can be updated and distributed to dynamically configure the user devices supported by the service provider to more optimally utilize the communication resources of the network.

Figure 4:
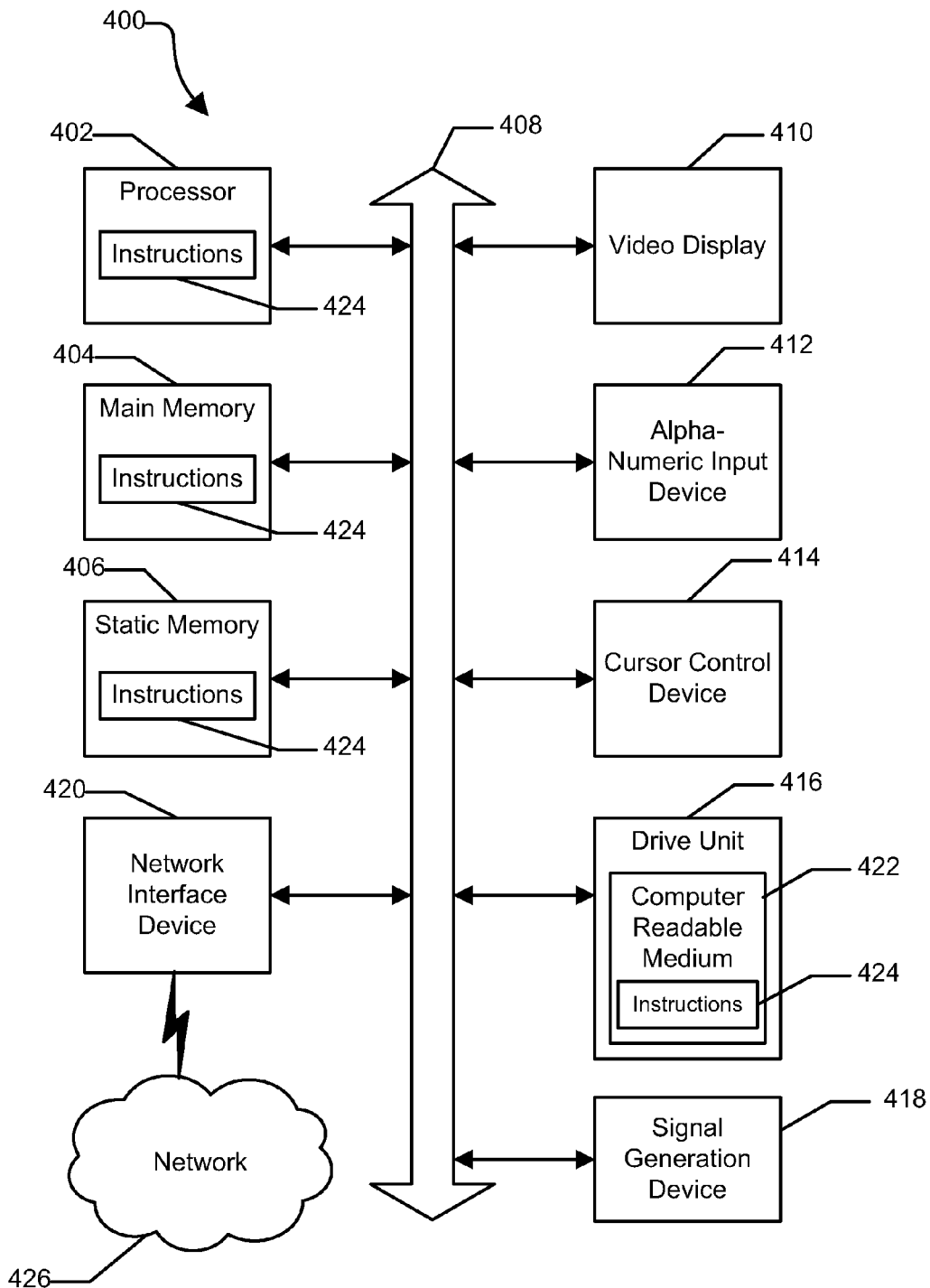
FIG. 4 is a diagram illustrating an example computer system for implementing one or more of the components or techniques described herein in accordance with at least one embodiment of the present disclosure.

FIG. 4 shows an illustrative embodiment of a general computer system 400 in accordance with at least one embodiment of the present disclosure. The computer system 400 can include a set of instructions that can be executed to cause the computer system 400 to perform any one or more of the methods or computer-based functions disclosed herein. The computer system 400 may operate as a standalone device or may be connected via a network to other computer systems or peripheral devices.

In a networked deployment, the computer system may operate in the capacity of a server or as a client user computer in a server-client user network environment, or as a peer computer system in a peer-to-peer (or distributed) network environment. The computer system 400 can also be implemented as or incorporated into a user device. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

The computer system 400 may include a processor 402, such as a central processing unit (CPU), a graphics processing unit (GPU), or both. Moreover, the computer system 400 can include a main memory 404 and a static memory 406 that can communicate with each other via a bus 408. As shown, the computer system 400 may further include a video display unit 410, such as a liquid crystal display (LCD), an organic light emitting diode (OLED), a flat panel display, a solid state display, or a cathode ray tube (CRT). Additionally, the computer system 400 may include an input device 412, such as a keyboard, and a cursor control device 414, such as a mouse, joystick, or arrow pads. The computer system 400 can also include a disk drive unit 416, a signal generation device 418, such as a speaker or remote control, and a network interface device 420.

In a particular embodiment, as depicted in FIG. 4, the disk drive unit 416 may include a computer-readable medium 422 in which one or more sets of instructions 424, such as software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media. The network interface device 420 can provide connectivity to a network 426, such as a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions to perform one or more of the operations described above. In a particular non-limiting, exemplary embodiment, the computer-readable medium can include a solid-state memory such as a memory card or other package that houses one or more non-volatile read-only memories. Further, the computer-readable medium can be a random access memory or other volatile re-writeable memory. Additionally, the computer-readable medium can include a magneto-optical or optical medium, such as a disk or tapes or other storage device. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission such as TCP/IP, UDP/IP, RTSP, and HTTP represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method comprising:
utilizing a configuration file obtained from a remote device to configure a communication of an application executed at a user device without requiring user input, wherein the configuration file comprises logic, and
applying the logic, by utilizing a processor that executes instructions from memory, to identify a select data bearer from a plurality of data bearers available to the user device for use in conducting the communication, wherein the select data bearer is identified from the plurality of data bearers available based on a parameter representing a current operational context of the user device, wherein the parameter representing the current operational context of the user device is based on an application type of the application.

2. The method of claim 1, further comprising:
obtaining the configuration file from the remote device.

3. The method of claim 2, wherein obtaining the configuration file comprises:
obtaining the configuration file from the remote device in response to a reboot of the user device.

4. The method of claim 1, wherein the logic is represented in a scripting language interpreted by a platform of the user device.

5. The method of claim 1, wherein the logic comprises:
logic to identify the parameter representing the current operational context of the user device;
logic to identify the plurality of data bearers available to the user device; and
logic to identify the select data bearer from the plurality of data bearers based on the parameter.

6. The method of claim 1, wherein the select data bearer is identified based on an additional parameter selected from a group of parameters consisting of:
a bandwidth of each of the plurality of data bearers;
a size of data to be communicated by the communication;
a destination of the communication;
a location of the user device; and
a protocol of the communication.

7. The method of claim 1, wherein the logic comprises:
logic to identify whether the communication is to be proxied, and, if the communication is to be proxied, to identify address information for a proxy server to be used for proxying the communication based on the parameter.

8. The method of claim 7, wherein the select data bearer is identified based on an additional parameter selected from a group of parameters consisting of:
a bandwidth of each of the plurality of data bearers;
a size of data to be communicated by the communication;
a destination of the communication;
a location of the user device; and
a protocol of the communication.

9. The method of claim 1, wherein the application comprises a first application, the select data bearer comprises a first select data bearer, and the method further comprises:
applying the logic of the configuration file to identify, from the plurality of data bearers available to the user device, a second select data bearer for use in conducting a communication of a second application.

10. A user device comprising:
a processor; and
a memory that stores a configuration file obtained from a remote device, the configuration file comprising instructions that, when executed by the processor, cause the processor to perform operations comprising:
identifying, from a plurality of data bearers available to the user device, a select data bearer for use in conducting a communication of an application, wherein the selected data bearer is identified from the plurality of data bearers based on a parameter representing a current operational context of the end user device, wherein the parameter representing the current operational context of the user device is based on an application type of the application.

11. The user device of claim 10, wherein the the configuration file is obtained from the remote device in response to a start of an execution of the application.

12. The user device of claim 10, wherein the configuration file comprises a proxy access control file and the logic is represented in a scripting language interpreted by the processor.

13. The user device of claim 10, wherein the configuration file comprises:
logic to identify the parameter representing the current operational context of the user device;
logic to identify the plurality of data bearers available to the user device; and
logic to identify the select data bearer from the plurality of data bearers based on the parameter.

14. The user device of claim 13, wherein the select data bearer is identified based on an additional parameter selected from a group of parameters consisting of:
a bandwidth of each of the plurality of data bearers;
a size of data to be communicated by the communication;
a destination of the communication;
a location of the user device; and
a protocol of the communication.

15. The user device of claim 10, wherein the logic further includes logic applied by the processor to identify whether the communication is to be proxied and, if the communication is to be proxied, to identify address information for a proxy server to be used for proxying the communication based on the parameter.

16. The user device of claim 15, wherein the select data bearer is identified based on an additional parameter selected from a group of parameters consisting of:
a bandwidth of each of the plurality of data bearers;

a size of data to be communicated by the communication;
a destination of the communication;
a location of the user device; and
a protocol of the communication.

17. A method, comprising:
generating, by utilizing a processor that executes instructions stored in memory, a configuration file comprising logic to be applied by the user device to select, without requiring user input, a select data bearer from a plurality of data bearers for conducting a communication of an application based on a parameter representing a current operational context of the user device, wherein the parameter representing the current operational context of the user device is based on an application type of the application; and
providing the configuration file for access by the user device.

18. The method of claim 17, wherein providing the configuration file for access comprises transmitting the configuration file to the user device in association with a firmware update.

19. The method of claim 17, wherein generating, by utilizing the processor that executes the instructions stored in the memory, the configuration file comprising the logic comprises generating the configuration file, wherein the logic comprises:
logic to identify the parameter representing the current operational context of the user device utilizing the configuration file;
logic to identify the plurality of data bearers available to the user device; and
logic to select, based on the parameter, the select data bearer from the plurality of data bearers for the communication of the application executed by the user device;
wherein the select data bearer is identified based on an additional parameter selected from a group of parameters consisting of:
a bandwidth of each of the plurality of data bearers;
a size of data to be communicated by the communication;
a destination of the communication;
a location of the user device; and
a protocol of the communication.

20. The method of claim 19, wherein generating, by utilizing the processor that executes the instructions stored in the memory, the configuration file comprising the logic comprises generating the configuration file, wherein the logic comprises:
logic to identify whether the communication is to be proxied and, if the communication is to be proxied, to identify address information for a proxy server to be used for proxying the communication based on the parameter.

* * * * *